Figure 1:
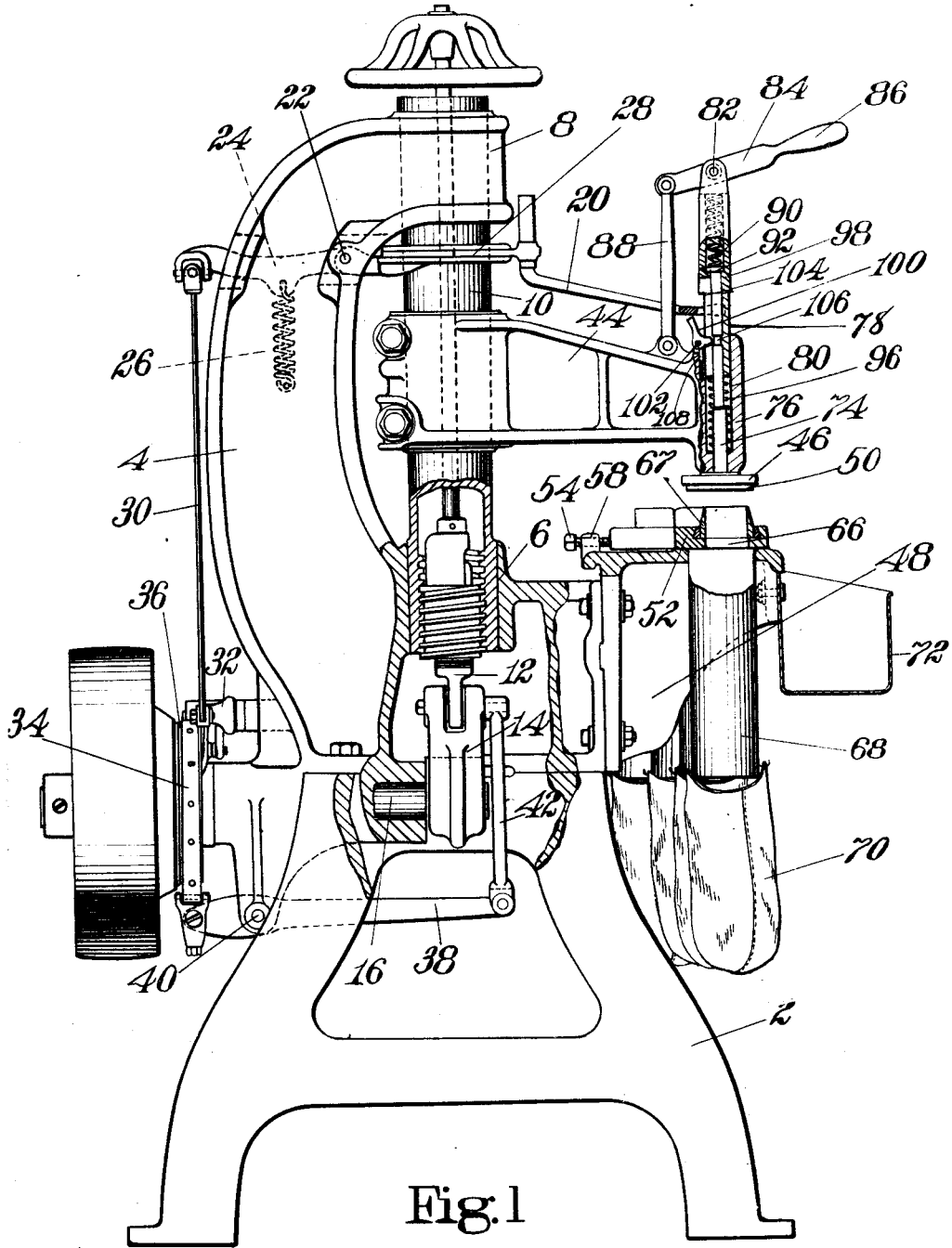

A. BATES.
MACHINE FOR CUTTING OUT SHEET MATERIAL.
APPLICATION FILED JULY 8, 1909.

1,051,665.

Patented Jan. 28, 1913.

2 SHEETS—SHEET 1.

A. BATES.
MACHINE FOR CUTTING OUT SHEET MATERIAL.
APPLICATION FILED JULY 8, 1909.
1,051,665.
Patented Jan. 28, 1913.
2 SHEETS—SHEET 2.
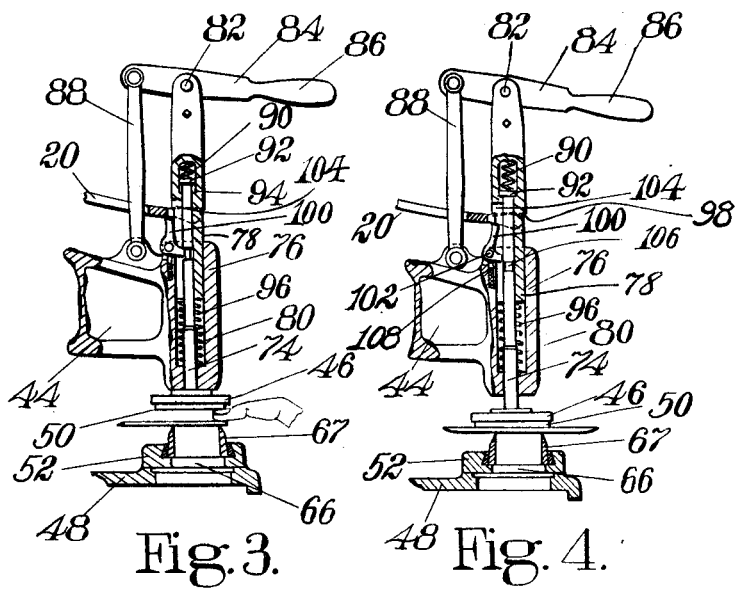
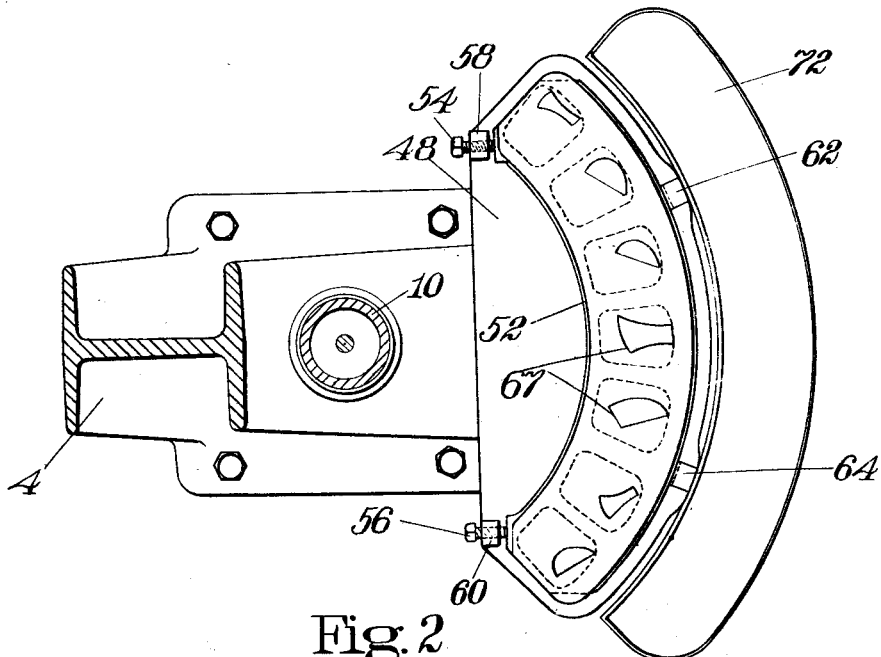
WITNESSES.
Elizabeth C. Coupe
Bertha M. Hutchinson
INVENTOR.
Arthur Bates
By his Attorney,
Nelson E. Howard

UNITED STATES PATENT OFFICE.

ARTHUR BATES, OF LEICESTER, ENGLAND, ASSIGNOR TO UNITED SHOE MACHINERY COMPANY, OF PATERSON, NEW JERSEY, A CORPORATION OF NEW JERSEY.

MACHINE FOR CUTTING OUT SHEET MATERIAL.

1,051,665.   Specification of Letters Patent.   Patented Jan. 28, 1913.

Application filed July 8, 1909. Serial No. 506,527.

*To all whom it may concern:*

Be it known that I, ARTHUR BATES, a subject of the King of England, residing at Leicester, in the county of Leicester, England, have invented certain Improvements in Machines for Cutting Out Sheet Material, of which the following description, in connection with the accompanying drawings, is a specification, like reference characters on the drawings indicating like parts in the several figures.

This invention relates to machines for cutting out sheet material.

In particular, the invention relates to machines of the class in which the cutting operation may be so selectively localized that the necessity for extensive movements to permit the proper inspection of the work, or for heavy parts to provide the required strength and stability, is avoided. Of machines of this class one known to the trade as the Clicking machine is in extensive use, and is disclosed in United States Letters Patent to Arthur Bates, No. 921,503, dated May 11, 1909.

As usually constructed the Clicking machine comprises a support for the stock, a die superposed on the stock upon the support, and a platen having a pressure surface area so dimensioned that it will not interfere with the inspection of the stock to be cut and of the die which is to cut the stock, said platen and support being so relatively movable that the platen may coöperate with the die wherever located upon the support.

An object of the present invention is to provide a machine of this type in which there may be a relative movement of the platen and the die into proximity to each other in advance of the actuation of the mechanism through which the relative pressing movement of the die and the platen is effected.

A further object of the invention is to provide a machine embodying many of the principles of construction and operation of the machine above referred to which will have especial utility for particular purposes such, for example, as the cutting out of heel lifts or parts of heel lifts.

Another object of the invention is to provide an improved machine for cutting out blanks, such as heel lifts or parts of heel lifts from small pieces or scraps of sheet material, which can be operated rapidly and in such manner that the material may be cut to the best advantage.

Furthermore the invention aims to provide a machine, especially adaptable to the class of work just referred to, in which the stock cutting die is so placed that the operator may readily determine the relationship of the die to the piece of material to be cut up without the necessity for lifting the die to place it in different positions upon the material.

With the foregoing and other objects in view the invention is herein shown as embodied in a machine in which a plurality of fixed dies adapted to cut blanks of different sizes or of different outlines are arranged, with their cutting edges up, beneath the path along which a coöperating platen has movement, whereby said platen may be brought into operative relation to any one of said dies. Preferably the platen is so dimensioned that it will coöperate with a single die only of the plurality of dies whereby the wear of the pressure surface of the platen and of the cutting edges of the dies is reduced to a minimum.

In operation, the material to be cut is placed upon the upturned edge of the die of the appropriate shape and is then pressed upon the die by the depression of the platen. Since the operator cannot readily determine the limits of the outline of the die after it is covered by the material and thereby might run the risk of having his finger caught between the platen and the edge of the die, provision is preferably made for bringing the platen into contact with the upper surface of the material, or into such predetermined proximity to the cutting edge of the die that the operator cannot keep his finger between the platen and die, before said platen is actuated to perform the pressing operation.

In one important aspect, therefore, the invention may be said to contemplate the provision in a machine of the class above described in which a pressing platen and a support are relatively movable, whereby the platen may be brought into operative relation to a die wherever located upon the support, and in which there is mechanism for effecting a relative pressing movement of the platen and the support, of an arrangement whereby the platen and the die may be brought into proximity to each other before the actuation of said mechanism.

Preferably the relative movement of the platen and the die into proximity to each other is predetermined and is preferably brought about by the means which serves to actuate the mechanism for effecting the relative pressing movement of the platen and the support.

In another aspect therefore the invention may be said to comprise the combination with a pressing platen and a support relatively movable whereby the platen may be brought into operative relation to a die wherever placed upon the support, of mechanism for effecting a relative pressing movement of the platen and the support and means for controlling said mechanism constructed to bring the platen and the die into predetermined proximity to each other before the actuation of said mechanism.

Preferably the means for bringing the platen and the die into predetermined proximity to each other and for actuating the mechanism which effects the relative pressing movement of the platen and the support is so constructed and arranged that the actuation of the mechanism for effecting the relative pressing movement will be positively prevented until the platen and the die are brought into the predetermined proximity to each other. Preferably also there will be a plurality of dies fixed upon the support with their cutting edges opposed to the plane in which the pressure surface of the platen lies.

More specifically, therefore, the invention may be said to comprise, in this aspect, the combination with a plurality of dies and a platen dimensioned to coöperate with a single die, said dies and platen being relatively movable to oppose any one of the dies to the platen, of means for effecting a die cutting relative movement of the platen and the opposed die, means for actuating the last-named means constructed to effect an initial relative movement of the platen and the opposed die, and means for preventing the actuation of the means for effecting the die cutting relative movement of the platen and the opposed die until said platen and die have been brought into predetermined proximity to each other.

To permit the convenient location of the pieces of material to be cut in proper relation to the dies best suited for cutting them, the dies are preferably so arranged upon the support that like dimensions will bear like relations to the operator, or, in other words, that like dimensions of the different dies shall lie in radii from a center coinciding substantially with the normal position of the operator.

As hereinabove suggested, the invention relates to machines of the class to which the machine shown in the United States Patent, No. 921,503, above referred to, belongs, and the invention is preferably embodied in a machine of this type. In the illustrated embodiment, therefore, the platen is carried by a presser arm attached at one end to a plunger mounted in bearings at one side of a support for vertical reciprocation and for oscillation about its vertical axis, said presser member being arranged to be swung over the support into operative relation to the dies arranged in series upon the support in much the same manner that the presser member illustrated in the patent above referred to is swung over the corresponding support or cutting bed of the machine therein disclosed.

To facilitate the swinging of the presser member over the support in the construction herein disclosed the means for actuating the operating mechanism is preferably so formed that it extends the lever arm of said presser member, whereby the power applied by the operator to swing the presser member is multiplied and thus less effort is required to bring the presser member into the desired position over the support.

As above suggested, the means for actuating the operating mechanism preferably comprises a part which is grasped by the operator in swinging the presser member over the support. This part, which, in the illustrated embodiment, is a handle, constituting part of a lever carried by the presser member, is preferably arranged to effect the relative movement of the platen and the opposed die or the relative movement of the platen and presser member in advance of the actuation of the mechanism which operates said member, and it will therefore be seen that in another aspect the invention comprises the provision in a machine of the class described of a single device by which the operator may both bring the presser member into a selective relation to the support and effect a relative vertical movement of the presser member and platen.

In still another aspect the invention comprises the provision in a machine of the class described of a single means for effecting the actuation of the operating mechanism for the presser member and, in advance of such actuation, a relative vertical movement of the platen and the presser member.

When, as in the illustrated preferred embodiment of the invention, all three functions referred to in the foregoing statements are performed by a single means, the invention may be said to comprise, in yet another aspect, the provision, in a machine of the class described, of a single device by which the operator may bring the presser member into the selected operative relation to the support, effect an actuation of the operating mechanism and, in advance of such actuation, a relative vertical movement of the platen and the presser member.

Other objects and features of the invention will be apparent from a consideration of the following description of the preferred form of the invention illustrated in the accompanying drawings, in which,—

Figure 1 is a side elevation, partly in section, of a machine embodying the invention, the parts being shown in their normal position when at rest; Fig. 2 is a horizontal section showing the support and the dies in plan; Fig. 3 is a detail sectional view of the mechanism carried on the forward end of the presser member, the parts being shown in a position intermediate the positions illustrated in Figs. 1 and 4; Fig. 4 is a view similar to Fig. 3, but showing the platen depressed into contact with the work in advance of its actuation to effect the cutting operation.

For convenience in manufacture the main portions of the machine are preferably of the same construction as the corresponding portions of the commercial Clicking machine hereinabove referred to. The like portions preferably comprise the base or stand 2 to which is bolted the upright casting 4 in which are the bearings 6 and 8 for the vertically reciprocating post or plunger 10, said post being connected at its lower end by a member 12 of a swivel carried by said post to an eccentric link 14. The eccentric link 14 receives an eccentric upon the forward end of a main driving shaft 16 which is arranged to be clutched at the will of the operator to a driving pulley or fly wheel 18 connected with any suitable source of power. The clutch through which the connection of the fly wheel 18 to the shaft 16 is effected is preferably of the type sometimes designated as "non-repeating clutch" and specifically may be the clutch illustrated in United States Letters Patent to Arthur Bates, No. 1,011,903, granted Dec. 19, 1911, for improvements in clutches.

The clutch is tripped or actuated by suitable connections to a lever arm 20 of a lever fulcrumed at 22 in the upright part 4 of the machine frame, the rear arm 24 of the lever being maintained normally in its lowermost position by a spring 26 connected at one end to said arm and at its other end to the machine frame. The forward lever arm 20 has intermediate its ends a swivel 28 surrounding the post 10 whereby the forward part of said arm may turn about a center lying in the axis of the post.

The lever arm 24 is connected by a rod 30 to a clutch tripping lever 32 not herein specifically illustrated. When the lever arm 20 is depressed a clutch, also not herein specifically illustrated, is tripped or actuated to effect a connection of the fly wheel 18 to the driving shaft 16 for one revolution only of said fly wheel, whereby the post 10 is lowered a predetermined distance dependent upon the eccentricity of the eccentric upon said shaft and is again returned to its uppermost position. A brake band 34 upon a brake drum 36 connected with the fly wheel 18 serves to stop the shaft 16 with the parts in the position just described since the brake band is applied by a lever 38 which is fulcrumed at 40 upon the machine frame and is operated by a link 42 connected to the pivotal connection between the swivel member 12 and the eccentric link 14, whereby the greatest braking pressure is applied when the eccentric link is in its uppermost position.

The parts of the machine thus far described are preferably the same in construction and operation as those of the commercial Clicking machine, with the exception that the lever arm 20 is slightly different in construction but not in function from a corresponding lever arm used with the commercial Clicking machine.

The post or plunger 10 is mounted in the bearings 6 and 8 for vertical reciprocation and for oscillation about its vertical axis and has clamped upon it an arm or presser member 44 carrying a platen 46, said platen being arranged to coöperate with a die or dies 67 carried upon a support 48 bolted to the casting 4. The platen 46 may comprise a portion 50 of material of such a nature that it will not dull the edge of an upturned die with which it coöperates, suitable materials for this purpose being wood, soft metal, rubber, fiber board, etc.

The dies with which the platen 46 coöperates are herein shown as arranged in an arc-shaped series with their edges upturned beneath the path along which the platen travels as it swings with the presser member 44. For convenience in adapting the dies to the work which they are required to perform, they are preferably fixed in a removable arc-shaped block 52 clamped in position upon the upper surface of the support 48 by set screws 54, 56, in upstanding lugs 58, 60, respectively, upon said support, said set screws forcing the blocks against other lugs 62, 64 upon the forward edge of the support.

The block 52 is provided with openings 66 beneath the dies 67 to permit the blanks cut by the dies to drop down through guides 68 into any suitable receptacle, such as a bag 70, there being preferably one bag for each guide. The dies 67 may be fixed in the block 52 in any suitable manner. As herein illustrated, the dies are somewhat enlarged at their lower ends and rest upon ledges or shoulders surrounding the openings 66, the block being provided with a recess cut back from the upper surface of the block around each die into which molten lead is flowed to fix the die in position. The dies may be made in similar or in different shapes, the dies herein illustrated being especially adapted to cut the sections of sectional heel lifts. These sections are usually cut from scraps of waste material left from other operations, such, for example, as the scraps left from the sole cutting operation, and for convenience in selecting the die best suited to the particular scrap or piece of material to be cut the dies are preferably arranged so that their like dimensions bear like relations to the operator whereby the operator may fit the piece of material to be cut to several different dies without changing its position in his hand. To this end the dies, as herein shown, are arranged with their longest dimensions lying in radii from a center coinciding substantially with the position of the operator in front of the machine. The scraps of material to be cut up may be contained in any suitable receptacle attached to the machine, such a receptacle being shown at 72. The receptacle 72 may conveniently be made of sheet iron shaped to extend along the line of the dies and is bolted to the front of the support 48.

As hereinabove suggested, the scraps from which the lift sections are cut are of very irregular shapes and of different sizes, and it frequently happens that the operator is obliged to hold the scrap upon the die best suited for cutting it until the platen comes into contact with the scrap or approximately into contact therewith. Inasmuch as it is difficult to determine the limits of the outline of the cutting edge of the die after it has been covered with the piece of material to be cut, the operator by this practice runs the risk of having his finger caught between the platen and the cutting edge of the die during the cutting operation and thereby injured. To avoid danger of injury to the operator and at the same time permit him to hold the scrap or other piece of material in position to be cut to the best advantage, provision is preferably made for bringing the platen yieldingly into work holding relation to the die in advance of the actuation of the machine to perform the cutting operation.

In the illustrated construction, the platen 46 is carried upon the lower end of a spindle 74 which passes up through the head 76 at the forward end of the presser member 44 into a sleeve or plunger 78 guided in a socket 80 in said head. The sleeve or plunger 78 has pivoted upon its upper end at 82 a lever 84 provided with a handle 86 and pivotally connected by a link 88 to the presser member 44. The sleeve or plunger 78 has in its hollow upper end a spring 90 which bears against a head 92 upon the upper end of the spindle 74 and causes said head to abut normally against a shoulder 94 in the sleeve 78. The lower end of the sleeve or plunger 78 bears against a spring 96 in the socket 80 of the head 76, the spring 96 maintaining the sleeve 78, spindle 74 and platen 46 normally in their uppermost positions shown in Fig. 1.

The forward end of the lever arm 20 is forked and embraces the sleeve 78 below an annular shoulder 98 which is adapted to engage the lever arm and depress it when the sleeve is depressed by the lever 84. To prevent a depression of the clutch controlling lever arm 20 before the platen 46 has been brought into predetermined proximity to the die 67, a trigger 100 is provided which is pivoted at 102 upon the presser member 44, said trigger being provided with an upright arm which rests normally beneath a solid portion of the clutch controlling arm 20 and with a toe which projects through a slot 104 in the sleeve 78 and engages an annular groove 106 in the spindle 74. The trigger is maintained normally in its locking relation to the clutch controlling arm 20 by a spring-pressed plunger 108 in a socket in the presser member 44. When the platen 46 is depressed by the lever 84 through the spring 90 bearing upon the head 92 of the spindle 74, the trigger will be turned about its pivot by the engagement of its toe in the groove 106 out of locking relation to the clutch controlling arm 20 and into alinement with the open space between the fork members at the forward end of the arm 20 or into alinement with a suitable slot provided for its reception, and said arm may then be depressed by the engagement of the shoulder 98 upon the sleeve 78 with the forked forward end of the arm. The movement of the trigger 100 out of locking relation to the clutch controlling arm 20 will, however, not take place until the platen 46 has been moved into predetermined proximity to the die 67. To prevent the uneven wear of the contact surface of the platen the platen is preferably made rotatable, togther with its spindle 74, the annular groove 106 for the trigger 100 permitting such rotation.

It will be noted that in the construction hereinabove described and illustrated in the accompanying drawings a single device is provided by which the operator may both move the presser member into the selected operative position and effect the movement of the platen 64 into predetermined proximity to the die with which it is to coöperate. It will be noted further that a single means is provided for depressing the platen to bring it into predetermined proximity to the die with which it is to coöperate and for tripping the clutch to effect the actuation of the presser member. Furthermore the handle 86 to be grasped by the operator for moving the presser member into the selected operative position and for depressing the platen and tripping the clutch is extended in the preferred embodiment of the invention as herein illustrated in such manner that it extends the lever arm of the presser member whereby the operator has the advantage of the increased length of the lever arm in swinging the presser member over the support.

From the foregoing description it will be seen that the machine of this invention has many advantages over other devices for cutting sectional heel lifts or similar articles hitherto in use and that it may be operated rapidly with absolute safety and in such manner as to effect the greatest saving of material.

Having described my invention, what I claim as new and desire to secure by Letters Patent of the United States is:—

1. A machine of the class described having, in combination, a plurality of inverted dies arranged in series, a platen dimensioned to coöperate with a single die and movable into operative position over any die of said series, mechanism for effecting a relative movement of the platen and the opposed die to cause stock supported upon said die to be cut thereby, and means for actuating said mechanism arranged to control the movements of said platen until said mechanism is actuated.

2. A machine of the class described having, in combination, a plurality of inverted dies arranged in series, a platen dimensioned to coöperate with a single die and movable into operative position over any die of said series, mechanism for effecting relative movement of the platen and the opposed die to cause stock supported upon said die to be cut thereby, and means for actuating said mechanism arranged to be grasped by the operator and movable with said platen in two directions at right angles to each other.

3. A machine of the class described having, in combination, a plurality of dies, a platen dimensioned to coöperate with a single die, said dies and platen being relatively movable to oppose any one of the dies to the platen, means for effecting a relative cutting movement of the platen and the opposed die, and means for actuating said last-named means constructed to effect an initial work engaging relative movement of said platen and die.

4. A machine of the class described having, in combination, a plurality of stationary inverted dies arranged in series, a platen movable over the dies into coöperative relation to different members of the series, means for moving the platen yieldingly into contact with stock supported upon an opposed die, and means actuated by the last-named means for effecting a stock cutting relative movement of the platen and the opposed die.

5. A machine of the class described having, in combination, a support, a presser member movable over the support into different operative relations thereto, a platen carried by the presser member, and a handle to be grasped by the operator in moving the presser member over the support constructed and arranged to depress the platen toward said support.

6. A machine of the class described having, in combination, a support, a presser member movable over the support into different operative relations thereto, a platen carried by the presser member and yieldingly maintained in predetermined relation thereto, and means for effecting a relative vertical movement of the platen and the presser member.

7. A machine of the class described having, in combination, a support, a presser member movable over the support into different operative relations thereto, a platen carried by the presser member and yieldingly maintained normally in predetermined relation to said member, a handle to be grasped by the operator in moving said member over the support constructed and arranged to effect a relative vertical movement of the platen and the presser member.

8. A machine of the class described having, in combination, a support, a presser member movable over the support into different operative relations thereto, a platen carried by the presser member and movable relatively thereto in a vertical direction, mechanism for effecting a relative pressing movement of the presser member and the support, and a single means for effecting a relative vertical movement of the presser member and platen and causing the actuation of said mechanism.

9. A machine of the class described having, in combination, a support, a presser member movable over the support into different operative relations thereto, a platen carried by the presser member and movable relatively thereto in a vertical direction, mechanism for effecting a relative pressing movement of the presser member and the support, and means for effecting the relative vertical movement of the presser member and the platen.

10. A machine of the class described having, in combination, a support, a presser member movable over the support into different operative relations thereto, a platen carried by the presser member and movable relatively thereto in a vertical direction, and a single device by which the movement of the presser member into the selected operative relation to the bed, and the relative vertical movement of the presser member and the platen may be effected.

11. A machine of the class described having, in combination, a pressing platen and a support, a die upon said support, said platen and support being relatively movable into different operative relations whereby the platen may be brought into operative relation to the die whenever located upon the support, and mechanism for effecting a relative pressing movement of the platen and the support constructed to come automatically to rest after a single operation, said machine being constructed and arranged to provide a relative movement of the platen and the die into proximity to each other in advance of the actuation of said mechanism.

12. A machine of the class described having, in combination, a support, a presser member movable over the support into different operative relations thereto, mechanism for effecting a relative pressing movement of the presser member and the support, and a platen carried by the presser member and movable relatively thereto in a vertical direction.

13. A machine of the class described having, in combination, a support, a presser member movable over the support into different operative relations thereto, a platen carried by the presser member and movable relatively thereto in a vertical direction, mechanism for effecting a relative pressing movement of the presser member and the support, and means carried by the presser member for actuating said mechanism constructed and arranged to effect a relative movement of the presser member and the platen.

14. A machine of the class described having, in combination, a support, a presser member movable over the support into different operative relations thereto, a platen carried by the presser member and movable relatively thereto in a vertical direction, operating mechanism for effecting a pressing movement of the presser member, and means for actuating the operating mechanism comprising a handle carried by the presser member arranged to be grasped by the operator in moving the presser member over the support and constructed and arranged to effect a relative movement of the platen and the presser member in advance of the actuation of the operating mechanism.

15. A machine of the class described having, in combination, a support, a presser member movable over the support into different operative relations thereto, a platen carried by the presser member and movable relatively thereto in a vertical direction, operating mechanism for effecting a pressing movement of the presser member, and actuating mechanism for the operating mechanism comprising a starting handle movable with the presser member over the support and movable relatively to the presser member to effect the actuation of the operating mechanism and in advance of such actuation a depression of the platen toward the support.

16. A machine of the class described having, in combination a support, a presser member movable over the support into different operative relations thereto, a platen carried by the presser member and movable relatively thereto in a vertical direction, operating mechanism for effecting the pressing movement of the presser member, and a single means for controlling the actuation of said operating mechanism and the relative vertical movement of the platen and presser member.

17. A machine of the class described having, in combination, a support, a presser member movable over the support into different operative relations thereto, a platen carried by the presser member and movable relatively thereto in a vertical direction, operating mechanism for effecting the pressing movement of the presser member, and a single means for effecting the actuation of said mechanism and the relative vertical movement of the platen and the presser member in advance of such actuation.

18. A machine of the class described having, in combination, a support, a presser member movable over the support into different operative relations thereto, a platen carried by the presser member and movable relatively thereto in a vertical direction, operating mechanism for effecting the pressing movement of the presser member, and a single device by which the operator may bring the presser member into the selected operative relation to the support, effect an actuation of the operating mechanism and in advance of such actuation a relative vertical movement of the platen and the presser member.

19. A machine of the class described having, in combination, a support, a pressing platen movable over the support into different operative relations thereto, a die upon the support with which the platen coöperates, mechanism for effecting a relative pressing movement of the platen and the support, and controlling means for said mechanism constructed to bring the platen into predetermined proximity to the support before the actuation of said mechanism.

20. A machine of the class described having, in combination, a support, a presser member movable over the support into different operative relations thereto, a platen carried by the presser member, a die upon the support with which the platen coöperates, means for effecting a relative pressing movement of the presser member and the die, and means carried by the presser member for effecting a relative movement of the presser member and the platen whereby the platen may be brought into predetermined proximity to the die in advance of the pressing operation.

21. A machine of the class described having, in combination, a support, a pressing platen movable over the support into different operative relations thereto, a die upon the support coöperating with the platen, mechanism for effecting a relative pressing movement of the platen and the die, a clutch for controlling the operation of said mechanism, clutch tripping means, means for operating the clutch tripping means, and means for preventing the operation of said clutch tripping means until the die and platen have been brought into predetermined proximity to each other.

22. A machine of the class described having, in combination, a plurality of dies and a platen dimensioned to coöperate with a single die, said dies and said platen being relatively movable in such manner that any die may be opposed to the platen, means for effecting a relative pressing movement of the platen and the opposed die, and means for yieldingly bringing the platen and the die into predetermined proximity to each other before their relative pressing movement.

23. A machine of the class described having, in combination, a plurality of dies of different shapes arranged in an arc-shaped series, a platen dimensioned to coöperate with a single die and arranged to be brought into coöperative relation to any die of the series, mechanism for effecting a relative pressing movement of the platen and the opposed die, and means for controlling the operation of said mechanism constructed to prevent its operation until the work to be operated upon has been clamped between the platen and the die.

24. A machine of the class described having, in combination, a plurality of dies and a platen dimensioned to coöperate with a single die, said dies and platen being relatively movable to oppose any one of the plurality of dies to the platen, mechanism for effecting a relative pressing movement of the platen and the opposed die, and a single means constructed and arranged to effect a relative movement of the platen and the opposed die into predetermined proximity to each other and an actuation of said mechanism.

25. A machine of the class described having, in combination, a support, dies arranged in an arc-shaped series upon the support, a plunger mounted in bearings at one side of the support for vertical reciprocation and for oscillation about its vertical axis, an arm upon the support, and a platen dimensioned to coöperate with a single die carried by the arm above the series of dies.

26. A machine of the class described having, in combination, a support, a plunger mounted in bearings at one side of the support for vertical reciprocation and for oscillation about its vertical axis, an arm carried by the plunger and extending over the support, a platen carried by the arm, and a series of inverted dies fixed upon the support beneath the path along which the platen travels, and means for causing said plunger to make a single reciprocation and then automatically to come to rest.

27. A machine of the class described having, in combination, relatively movable members, yielding means for causing said members to move together, a platen carried by one of said members, clutch tripping means actuated by the other of said members, a die with which said platen coöperates, means for moving one of said members whereby a yielding tendency to move is imparted to the other member, and means for preventing an actuation of the clutch tripping means before the platen has been brought into predetermined proximity to the die.

28. A machine of the class described having, in combination, a plurality of fixed inverted dies shaped to cut the different sections of a sectional heel lift, a platen movable into operative position over any one of said dies, mechanism for effecting a relative movement of the platen and the opposed die to cause stock supported upon said die to be cut thereby, and means for actuating said mechanism arranged to control the movements of said platen until said mechanism is actuated.

29. A machine of the class described having, in combination, a plurality of fixed dies shaped to cut different sections of sectional heel lifts and arranged in an arc-shaped series, a platen movable about the center of the circle of which the series of dies forms an arc into operative relation to any die of said series, and means for effecting a relative cutting movement of said platen and the opposed die constructed to come automatically to rest after a single operation.

30. A machine of the class described having, in combination, a plurality of fixed dies shaped to cut different sections of sectional heel lifts from irregular scraps of waste material, a platen movable into coöperative relation to any one of said dies, means for effecting a relative cutting movement of said platen and the opposed die constructed to come automatically to rest after a single operation, and means for bringing said platen into such relation to said die that it holds the work upon the die in advance of the cutting operation.

31. A machine of the class described having, in combination, a plurality of fixed dies arranged in an arc-shaped series, the center of the arc lying upon the side of the series of dies remote from the operator, a platen arranged to be moved about said center into operative relation to any die of the series, and means for effecting a relative pressing movement of the platen and the opposed die, said dies being fixed with their longest dimensions coinciding with radii from a center which coincides substantially with the position of the operator.

32. A machine of the class described having, in combination, a support, a presser member arranged to swing over the support into different operative relations thereto, a die upon the support, means for effecting a relative pressing movement of the die and the presser member, and a starting handle for actuating said last-named means constructed to increase the length of the lever arm of the presser member.

33. A machine of the class described having, in combination, a support, a plunger mounted in bearings at one side of the support for vertical reciprocation and for oscillation about its vertical axis, an arm carried by the plunger and extending over the support, a platen carried by the arm, a series of dies fixed upon the support beneath the path along which the platen travels, and a starting handle constructed to increase the leverage of the arm whereby said arm may be easily swung over the support by said handle.

34. A machine of the class described having, in combination, a plurality of inverted dies, a platen movable over the dies into cooperative relation to any one of said dies, means for effecting a relative pressing movement of the platen and the opposed die, means movable with said platen in two directions for actuating the afore-mentioned means and receptacles beneath the dies to receive the blanks cut thereby.

In testimony whereof I have signed my name to this specification in the presence of two subscribing witnesses.

ARTHUR BATES.

Witnesses:
ARTHUR ERNEST JEMAIN,
KATHERINE PEXTON.

Copies of this patent may be obtained for five cents each, by addressing the "Commissioner of Patents, Washington, D. C."

31. A machine of the class described having, in combination, a plurality of fixed dies arranged in an arc-shaped series, the center of the arc lying upon the side of the series of dies remote from the operator, a platen arranged to be moved about said center into operative relation to any die of the series, and means for effecting a relative pressing movement of the platen and the opposed die, said dies being fixed with their longest dimensions coinciding with radii from a center which coincides substantially with the position of the operator.

32. A machine of the class described having, in combination, a support, a presser member arranged to swing over the support into different operative relations thereto, a die upon the support, means for effecting a relative pressing movement of the die and the presser member, and a starting handle for actuating said last-named means constructed to increase the length of the lever arm of the presser member.

33. A machine of the class described having, in combination, a support, a plunger mounted in bearings at one side of the support for vertical reciprocation and for oscillation about its vertical axis, an arm carried by the plunger and extending over the support, a platen carried by the arm, a series of dies fixed upon the support beneath the path along which the platen travels, and a starting handle constructed to increase the leverage of the arm whereby said arm may be easily swung over the support by said handle.

34. A machine of the class described having, in combination, a plurality of inverted dies, a platen movable over the dies into coöperative relation to any one of said dies, means for effecting a relative pressing movement of the platen and the opposed die, means movable with said platen in two directions for actuating the afore-mentioned means and receptacles beneath the dies to receive the blanks cut thereby.

In testimony whereof I have signed my name to this specification in the presence of two subscribing witnesses.

ARTHUR BATES.

Witnesses:
ARTHUR ERNEST JEMAIN,
KATHERINE PEXTON.

---

Copies of this patent may be obtained for five cents each, by addressing the "Commissioner of Patents, Washington, D. C."

---

Correction in Letters Patent No. 1,051,665.

It is hereby certified that in Letters Patent No. 1,051,665, granted January 28, 1913, upon the application of Arthur Bates, of Leicester, England, for an improvement in "Machines for Cutting Out Sheet Material," an error appears in the printed specification requiring correction as follows: Page 6, line 12, for the word "whenever" read *wherever;* and that the said Letters Patent should be read with this correction therein that the same may conform to the record of the case in the Patent Office.

Signed and sealed this 22nd day of April, A. D., 1913.

[SEAL.]

C. C. BILLINGS,

*Acting Commissioner of Patents.*

Correction in Letters Patent No. 1,051,665.

It is hereby certified that in Letters Patent No. 1,051,665, granted January 28, 1913, upon the application of Arthur Bates, of Leicester, England, for an improvement in "Machines for Cutting Out Sheet Material," an error appears in the printed specification requiring correction as follows: Page 6, line 12, for the word "whenever" read *wherever;* and that the said Letters Patent should be read with this correction therein that the same may conform to the record of the case in the Patent Office.

Signed and sealed this 22nd day of April, A. D., 1913.

[SEAL.]

C. C. BILLINGS,

*Acting Commissioner of Patents.*